United States Patent
Kleffmann et al.

(10) Patent No.: US 9,902,207 B2
(45) Date of Patent: Feb. 27, 2018

(54) PNEUMATIC VEHICLE TIRE

(71) Applicant: Continental Reifen Deutschland GmbH, Hannover (DE)

(72) Inventors: Jens Kleffmann, Hannover (DE); Joerg Bartke, Hannover (DE); Anastassia Pokutta-Paskaleva, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 618 days.

(21) Appl. No.: 14/143,456

(22) Filed: Dec. 30, 2013

(65) Prior Publication Data

US 2014/0110027 A1   Apr. 24, 2014

Related U.S. Application Data

(63) Continuation of application No. PCT/EP2012/060550, filed on Jun. 5, 2012.

(30) Foreign Application Priority Data

Jun. 28, 2011   (DE) .................. 10 2011 051 387

(51) Int. Cl.
*B60C 11/03* (2006.01)
*B60C 11/13* (2006.01)

(52) U.S. Cl.
CPC ............ *B60C 11/03* (2013.01); *B60C 11/033* (2013.01); *B60C 11/0306* (2013.01);
(Continued)

(58) Field of Classification Search
CPC .................. B60C 11/03; B60C 11/0306; B60C 2011/0348; B60C 2011/036;
(Continued)

(56) References Cited

U.S. PATENT DOCUMENTS 5,240,053 A    8/1993  Baumhoefer et al.
D365,051 S  * 12/1995  Brayer .................. D12/553
(Continued)

FOREIGN PATENT DOCUMENTS

EP    0 729 854 A2       9/1996
GB    2 018 208 A       10/1979
JP    63291705 A  *    11/1988  ............. B60C 11/06

OTHER PUBLICATIONS

Machine translation of JP63-291705 (no date).*
(Continued)

*Primary Examiner* — Michael H Wilson
*Assistant Examiner* — Philip N Schwartz
(74) *Attorney, Agent, or Firm* — Walter Ottesen, P.A.

(57) ABSTRACT

A pneumatic vehicle tire for commercial vehicles is provided wherein the wet traction properties are improved with simultaneously good rolling resistance properties. At least 120 transverse grooves are arranged in each of the central profile ribs over the entire circumference of the tire. The width (B1) of the transverse grooves in the central profile ribs is maximally 1.5 mm at a distance of 3.5 mm from the profile surface, and the width of each inner circumferential groove is maximally 4 mm at a distance of 3.5 mm from the profile surface.

1 Claim, 1 Drawing Sheet

(52) U.S. Cl.
CPC ......... *B60C 11/13* (2013.01); *B60C 2011/036* (2013.01); *B60C 2011/0348* (2013.01); *B60C 2011/0365* (2013.01); *B60C 2011/0372* (2013.01); *B60C 2200/06* (2013.01); *Y02T 10/862* (2013.01)

(58) Field of Classification Search
CPC ..... B60C 2011/0365; B60C 2011/0372; B60C 2200/06
USPC .............................. 152/DIG. 3; D12/551–556
See application file for complete search history.

(56) References Cited

U.S. PATENT DOCUMENTS

| | | | |
|---|---|---|---|
| 5,535,798 | A | 7/1996 | Nakamura |
| 6,250,354 | B1 * | 6/2001 | Kawai ................. B60C 11/0306 152/209.18 |
| 2011/0048603 | A1 * | 3/2011 | Kleffmann .............. B60C 11/04 152/209.21 |

OTHER PUBLICATIONS

Continental: "Truck, Bus, Coach & Contruction Tires, Retreading, Fleet Service . . . HSL ECO-Plus, HDL ECO-Plus, HTR 2. HSR 2, HDL1 Superdrive, HTR/HT 63. HSR 1, . . . 2, HTR/HT 41. HSR, HDR+, HTR1. HS 41, . . . , HTW. HSR/RS 415 N, HD 70, HTC1. LSR1 . . . ", Aug. 12, 2009, XP002683458, www.conti-online.com/generator/www/de/en/continental/transport/general/home/index_en.html.
International Search Report dated Nov. 9, 2012 of international application PCT/EP2012/060550 on which this application is based.

* cited by examiner

PNEUMATIC VEHICLE TIRE

CROSS REFERENCE TO RELATED APPLICATIONS

This application is a continuation application of international patent application PCT/EP2012/060550, filed Jun. 5, 2012, designating the United States and claiming priority from German application 10 2011 051 387.6, filed Jun. 28, 2011, and the entire content of both applications is incorporated herein by reference.

FIELD OF THE INVENTION

The invention relates to a pneumatic vehicle tire for commercial vehicles.

BACKGROUND OF THE INVENTION

A tire of the type stated at the outset is known from U.S. Pat. No. 5,535,798 B, for example. In order to achieve uniform abrasion of the tread, this tire is divided into circumferential ribs by four wide circumferential grooves running round in the circumferential direction, wherein a further, narrow circumferential groove running round in the circumferential direction is provided in each of the two circumferential ribs at the shoulders close to the edges of the tread. The wide circumferential grooves are bounded by groove flank surfaces which are provided with depressions that are the negative of three-sided pyramids, the points of which face the periphery of the tread.

In order to lower the rolling resistance of pneumatic vehicle tires, a large number of measures has already been proposed.

An improvement in the rolling resistance can often have negative effects on other important properties of the tire, for example, on the wet grip properties of the tire. The wet grip properties essentially affect the properties during braking on a wet underlying road surface.

SUMMARY OF THE INVENTION

It is an object of the invention to embody the tread of a pneumatic vehicle tire of the type described above in such a way that, while achieving good rolling resistance properties, the wet grip properties are simultaneously improved.

According to a feature of the invention, at least 120 transverse grooves are arranged in each of the central profile ribs over the entire circumference of the tire, wherein the width of the transverse grooves in the central profile ribs is no more than 1.5 mm at a distance of 3.5 mm from the profile surface, and wherein the width of each inner circumferential groove is no more than 4 mm at a distance of 3.5 mm from the profile surface.

One advantage of the vehicle tire according to the invention is that optimization of the profile gives the vehicle tire very good wet grip properties and, at the same time, the rolling resistance properties are likewise held at a very high level. The optimized and improved tire profile has been demonstrated by a large number of tests. The increased profiling, in accordance with the invention, of the tire profile through the large number of transverse grooves with the abovementioned dimensions has led essentially to better wet grip properties and, at the same time, the rolling resistance is likewise held at a high level. In the case of conventional profile optimizations, in contrast, greater profiling generally led to a significant deterioration in rolling resistance.

In another advantageous feature of the invention, provision is made for the transverse grooves in the central profile ribs to be arranged at an angle greater than 60° with reference to the circumferential direction.

By means of this alignment of the transverse grooves, optimum wet grip properties are achieved for the vehicle tire.

In another advantageous feature of the invention, provision is made for the difference in depth between the depth of the transverse grooves in the central profile ribs and the depth of the inner circumferential grooves to be no more than 2 mm.

As a result, the tire has a high starting and braking traction over its entire normal service life. One embodiment is shown in FIG. 2, which indicates the difference T5 in depth between the depth of the transverse grooves T2 and the depth of the inner circumferential grooves T3.

According to another advantageous feature of the invention, provision is made for the difference in depth between the depth of the inner circumferential grooves and the depth of the shoulder grooves to be no more than 2 mm.

As a result, the vehicle tire has particularly good wet grip properties over the entire normal service life.

One embodiment is shown by FIG. 2, which indicates the difference T6 in depth between the depth of the inner circumferential grooves T3 and the depth T4 of the shoulder grooves.

In another advantageous feature of the invention, provision is made for the depth of the transverse grooves in the central profile ribs to be 11 to 14 mm.

By virtue of this depth dimension, the properties mentioned are maintained over the entire normal service life of the vehicle tire.

According to another advantageous feature of the invention, provision is made for the depth of the inner circumferential grooves to be 9 to 14 mm and/or the depth of the shoulder grooves to be 9 to 14 mm.

According to still another advantageous feature of the invention, provision is made for the length of extent of the transverse grooves in the central profile ribs to be at least 80% of the total width of the central profile rib.

Good starting and braking traction for the vehicle tire is thereby ensured.

According to another advantageous feature of the invention, provision is made for the transverse grooves in the central profile ribs to be arranged in an arrow shape, wherein the arrow tip is formed by the central inner circumferential groove.

By means of this arrangement, particularly good wet handling properties of the vehicle tire are achieved.

According to another advantageous feature of the invention, provision is made for further transverse grooves to be arranged in the shoulder ribs.

The transverse grooves in the shoulder ribs increase the starting and braking traction of the vehicle tire.

In another advantageous feature of the invention, provision is made for the width of the central profile ribs to be in a range of from 25 to 55 mm, preferably in a range of between 35 and 45 mm.

In another advantageous feature of the invention, provision is made for the total groove volume of the circumferential grooves, shoulder grooves and transverse grooves in the tread to be between 1% and 10% of the gross volume of the tread, wherein the gross volume of the tread is based on the deepest groove in the tread.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
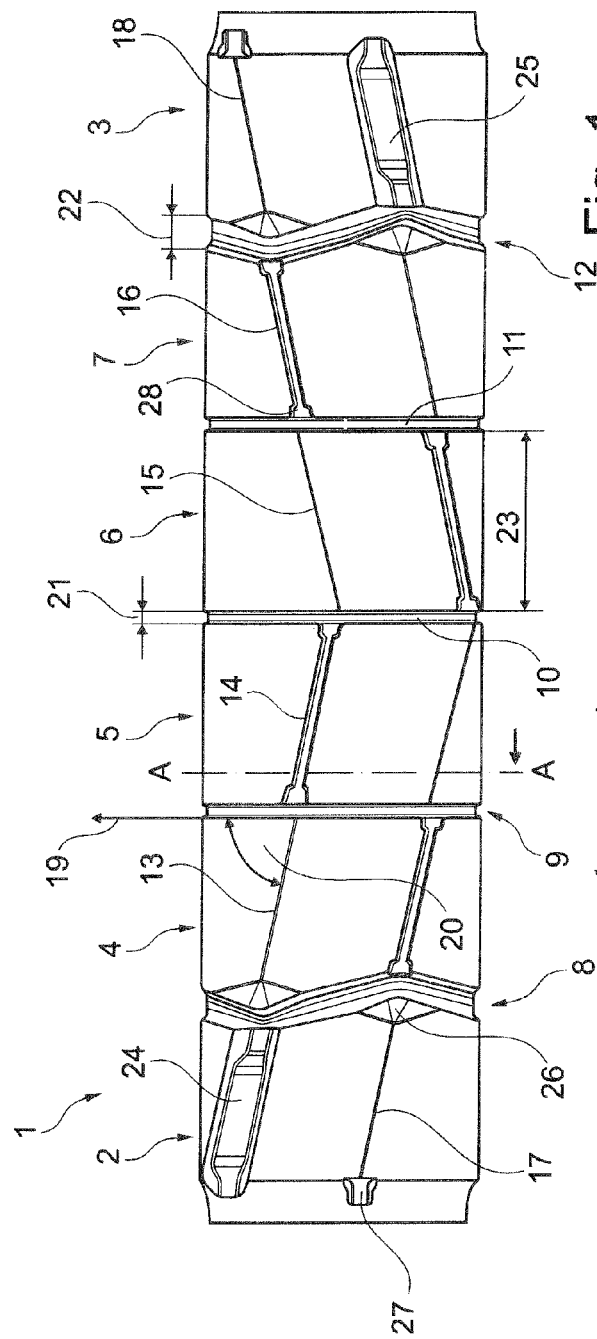
FIG. 1 shows a plan view of the tire profile according to the invention.

FIG. 1 shows the tread 1 of the pneumatic vehicle tire according to the invention for commercial vehicles.

Only a partial segment of the tire profile is depicted in the figure. The tire profile comprises a left-hand shoulder rib 2, a right-hand shoulder rib 3 and central profile ribs 4 to 7. The profile ribs represent the positive of the tire profile. These profile ribs are separated in circumferential direction 19 by the two shoulder grooves 8 and 12 and by the inner circumferential grooves 9 to 11.

The ribs are divided in axial direction 32 of the tread 1 by transverse grooves 13 to 16 in the central profile ribs and by transverse grooves 17 and 18 in the shoulder ribs 2 and 3. Transverse grooves 13 to 16 can have different widths. In this embodiment, transverse grooves 13 and 15 have a width of about 0.5 mm. Transverse grooves 14 and 16, in contrast, have a width of about 1.5 mm. Transverse grooves 13 to 16 extend in the central profile ribs 4 to 7 over the entire width thereof. The angle 20 between the circumferential direction 19 and the alignment of transverse grooves 13 and 14 is in a range of less than 60°. Moreover, transverse grooves 13 and 14 and transverse grooves 15 and 16 are arranged in an arrow shape, wherein the arrow tip is formed by the inner circumferential groove 10. In this embodiment, the shoulder ribs 2 and 3 likewise have transverse grooves 17, 18, 24 and 25.

Transverse grooves 24 and 25 are wider than transverse grooves 17 and 18. Recesses 27 can be arranged laterally on the shoulder ribs 2 and 3, these recesses being connected to transverse groove 17. In the central profile ribs 4 to 7, the number of transverse grooves 13, 14, 15 and 16 in each central profile rib is at least 120 in number over the entire circumference of the tire. Very good wet grip properties are achieved by means of this large number of transverse grooves. The inner circumferential grooves 9, 10 and 11 have a width 21 which is in a range of from 1 mm to 4 mm. The width 22 of the shoulder grooves 8 and 12 is in a range of from 1 mm to 15 mm. The width 23 of the inner profile ribs 4, 5, 6 and 7 is between 25 mm and 55 mm.

In some parts of the profile at the profile block surface, there are chamfers 26, which extend into the shoulder grooves 8 and 12. The groove volume is the sum of the circumferential grooves, shoulder grooves and transverse grooves in the tread 1. The groove volume represents the volume of the profile negative. The corresponding gross volume of the tread is based on the deepest groove in the tread 1. At the deepest point in the tire profile, an imaginary line is drawn in a horizontal direction, wherein the gross volume is formed by the upper part of the tread. In the embodiment in FIG. 1, the shoulder grooves 8 and 12 have a zigzag pattern. The wet grip properties are optimized by this zigzag pattern. It is likewise possible for the shoulder grooves 8 and 12 to run in a completely straight line, like the inner circumferential grooves 9 to 11.

Figure 2:
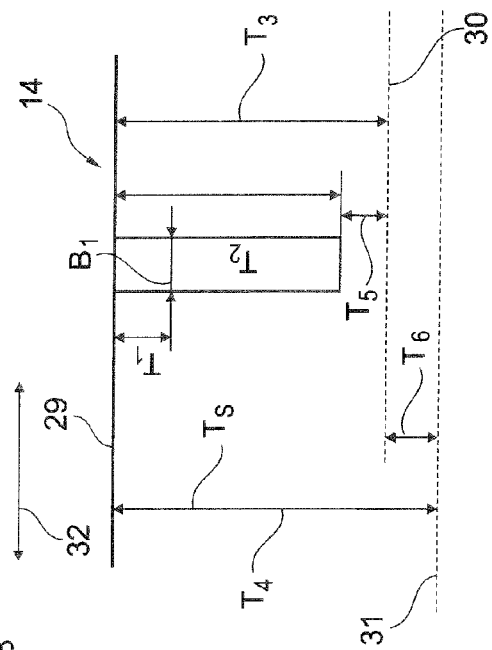
FIG. 2 shows a section through the tire profile in FIG. 1 at section line A-A.

FIG. 2 shows a section A-A through the tire profile in FIG. 1. It is essentially the depth of transverse groove 14 which is illustrated by this view. The depth T2 of the transverse groove is preferably 11 mm to 14 mm. The width B1 of the transverse groove is no more than 1.5 mm, wherein this width is measured at a depth T1 of 3.5 mm. The depth dimensions are in each case based on the profile surface 29. The depth T3 of the inner circumferential grooves is preferably between 9 mm and 14 mm. The depth T4 of the shoulder groove is preferably between 9 and 14 mm. Dashed line 30 represents the depth level of the lower edge of the inner circumferential grooves. Dashed line 31 shows the depth level of the lower edge of the shoulder grooves. Depth T5 indicates the maximum difference between the depth T2 of the transverse grooves and the depth T3 of the inner circumferential groove. Depth T5 is preferably less than 2 mm. Depth T6 indicates the maximum difference between the depth of the inner circumferential grooves and the depth of the shoulder grooves. Depth T6 is no more than 2 mm.

Table 1 shows test results obtained with the vehicle tire according to the invention. This table shows the test results for five different tire profiles. One surprising finding of the test results is that test tires E3 are provided with a relatively large number of transverse grooves, which do not lead to any deterioration in rolling resistance. On test tire E3, the number of transverse grooves is 140, which are distributed uniformly over the circumference of the central profile ribs. At the same time, the values for wet adhesion during braking and starting are increased by about 5%. The value for rolling resistance is abbreviated with the letters RR and is about 100% for all the reference tires. The values for wet adhesion during braking and starting are given in the last row.

The surprising finding is that adding transverse grooves in the central profile ribs does not lead to any decrease in rolling resistance if the inner circumferential grooves used have a width of 3.5 mm and the transverse grooves have a maximum width of 1.5 mm. This finding is demonstrated by the test results in Table 1. It is surprising since, in previous test series with tires that have wider inner grooves, adding transverse grooves in the central ribs led to a significant decrease in rolling resistance, as the test results in Table 5 show. Also surprising is the fact that, based on a tire with 4 circumferential grooves with narrow inner grooves, adding a fifth narrow circumferential groove did not lead to any decrease in rolling resistance, whatever the width of the shoulder grooves. This is shown by the test results in Table 2. In previous tests, adding wider circumferential grooves led to the decrease in rolling resistance, as shown by the test results in Table 3.

TABLE 1

|  |  | Ref. 2 | B2 | E1 | E2 | E3 |
|---|---|---|---|---|---|---|
| Circumferential shoulder grooves | Groove width, groove base | 3 mm | 3 mm | 3 mm | 3 mm | 3 mm |
|  | Groove width 3.5 mm below tread surface | 7.5 mm | 7.5 mm | 7.5 mm | 7.5 mm | 7.5 mm |
|  | Number of shoulder grooves | 2 | 2 | 2 | 2 | 2 |
| Circumferential inner grooves | Groove width, groove base | 2 mm | 2 mm | 2 mm | 2 mm | 2 mm |

TABLE 1-continued

|  |  | Ref. 2 | B2 | E1 | E2 | E3 |
|---|---|---|---|---|---|---|
|  | Groove width 3.5 mm below tread surface | 3.5 mm | 3.5 mm | 3.5 mm | 3.5 mm | 3.5 mm |
|  | Number of inner grooves | 2 | 3 | 3 | 3 | 3 |
|  | Width of transverse grooves | 0.5 mm | 0.5 mm | 0.5 mm | 0.5 mm | 0.5 mm |
|  | Number of transverse grooves | 100 | 100 | 40 | 120 | 140 |
|  | RR (drum test as per ISO 28580) | 100% | 100% | 100% | 100% | 100% |
|  | Wet adhesion, cornering (assessment by a standardized internal vehicle test) | 100% | 102% | 102% | 102% | 102% |
|  | Wet adhesion, braking/starting (assessment by standardized internal vehicle test) | 100% | 100% | 99% | 102% | 105% |

TABLE 2

|  |  | Ref. 1 | A1 |
|---|---|---|---|
| Circumferential shoulder grooves | Groove width, groove base | 12 mm | 12 mm |
|  | Groove width 3.5 mm below tread surface | 18 mm | 18 mm |
|  | Number of shoulder grooves | 2 | 2 |
| Circumferential inner grooves | Groove width, groove base | 2 mm | 2 mm |
|  | Groove width 3.5 mm below tread surface | 3.5 mm | 3.5 mm |
|  | Number of inner grooves | 2 | 3 |
|  | Width of transverse grooves | 0.5 mm | 0.5 mm |
|  | Number of transverse grooves | 100 | 100 |
|  | RR (drum test as per ISO 28580) | 100% | 100% |

TABLE 3

|  |  | Ref. 5 | F1 |
|---|---|---|---|
| Circumferential shoulder grooves | Groove width, groove base | 12 mm | 12 mm |
|  | Groove width 3.5 mm below tread surface | 18 mm | 18 mm |
|  | Number of shoulder grooves | 2 | 2 |
| Circumferential inner grooves | Groove width, groove base | 12 mm | 12 mm |
|  | Groove width 3.5 mm below tread surface | 18 mm | 18 mm |
|  | Number of inner grooves | 2 | 3 |
|  | Width of transverse grooves | 0.5 mm | 0.5 mm |
|  | Number of transverse grooves | 100 | 100 |
|  | RR (drum test as per ISO 28580) | 100% | 103% |

TABLE 4

|  |  | Ref. 3 | C1 | C2 | C3 | C4 |
|---|---|---|---|---|---|---|
| Circumferential shoulder grooves | Groove width, groove base | 12 mm | 12 mm | 12 mm | 12 mm | 12 mm |
|  | Groove width 3.5 mm below tread surface | 18 mm | 18 mm | 18 mm | 18 mm | 18 mm |
|  | Number of shoulder grooves | 2 | 2 | 2 | 2 | 2 |
| Circumferential inner grooves | Groove width, groove base | 12 mm | 12 mm | 12 mm | 12 mm | 12 mm |
|  | Groove width 3.5 mm below tread surface | 18 mm | 18 mm | 18 mm | 18 mm | 18 mm |
|  | Number of inner grooves | 2 | 2 | 2 | 2 | 2 |
|  | Width of transverse grooves | 0.5 mm | 2 mm | 5 mm | 8 mm | 12 mm |
|  | Number of transverse grooves | 100 | 100 | 100 | 100 | 100 |
|  | RR (drum test as per ISO 28580) | 100% | 104% | 109% | 112% | 114% |

TABLE 5

|  |  | Ref. 4 | D1 | D2 | D3 | D4 |
|---|---|---|---|---|---|---|
| Shoulder grooves | Groove width, groove base | 12 mm | 12 mm | 12 mm | 12 mm | 12 mm |
|  | Groove width 3.5 mm below tread surface | 18 mm | 18 mm | 18 mm | 18 mm | 18 mm |
|  | Number of shoulder grooves | 2 | 2 | 2 | 2 | 2 |
| Inner grooves | Groove width, groove base | 12 mm | 12 mm | 12 mm | 12 mm | 12 mm |
|  | Groove width 3.5 mm below tread surface | 18 mm | 18 mm | 18 mm | 18 mm | 18 mm |
|  | Number of inner grooves | 2 | 2 | 2 | 2 | 2 |
|  | Width of transverse grooves | 0.5 mm | 0.5 mm | 0.5 mm | 0.5 mm | 0.5 mm |
|  | Number of transverse grooves | 100 | 40 | 50 | 75 | 140 |
|  | RR (drum test as per ISO 28580) | 100% | 106% | 105% | 102% | 96% |

It is understood that the foregoing description is that of the preferred embodiments of the invention and that various changes and modifications may be made thereto without departing from the spirit and scope of the invention as defined in the appended claims.

LIST OF REFERENCE SIGNS 1 tread
2 left-hand shoulder rib
3 right-hand shoulder rib
4 central profile rib
5 central profile rib
6 central profile rib
7 central profile rib
8 shoulder groove
9 inner circumferential groove
10 central inner circumferential groove
11 inner circumferential groove
12 shoulder groove
13 transverse grooves in the central profile ribs (about 0.5 mm wide)
14 transverse grooves in the central profile ribs (about 1.5 mm wide)
15 transverse grooves in the central profile ribs (about 0.5 mm wide)
16 transverse grooves in the central profile ribs (about 1.5 mm wide)
17 narrow transverse grooves in the shoulder ribs
18 narrow transverse grooves in the shoulder ribs
19 circumferential direction of the tire
20 angle between alignment of the transverse groove and the circumferential direction
21 width of the inner circumferential grooves
22 width of the shoulder grooves
23 width of the inner profile ribs
24 wide transverse grooves in the shoulder ribs
25 wide transverse grooves in the shoulder ribs
26 chamfers on the profile block surface
27 recess on the shoulder rib
28 recess on the transverse groove
29 profile surface
30 depth level of the lower edge of the inner circumferential grooves
31 depth level of the lower edge of the shoulder grooves
32 axial direction B1 width of the transverse groove at distance T1 from the profile surface
T1 depth at which the width of the transverse groove is measured
T2 depth of the transverse groove
T3 depth of the inner circumferential groove
T4 depth of the shoulder groove
T5 maximum difference between the depth of the transverse groove and the depth of the inner circumferential groove
T6 maximum difference between the depth of the inner circumferential groove and the depth of the shoulder groove

What is claimed is:

1. A pneumatic vehicle tire for utility vehicles defining a profile surface, a circumferential direction and a tire circumference, the pneumatic vehicle tire comprising:
 a tread defining a first shoulder groove and a second shoulder groove and first, second, and third inner circumferential grooves;
 a first side wall and a second side wall;
 four central profile ribs;
 a first shoulder rib and a second shoulder rib;
 said profile ribs and said shoulder ribs being aligned approximately in the circumferential direction of the tire circumference;
 said first shoulder groove and second shoulder groove being in the form of a zigzag pattern, each deviating in alternating directions in the radial direction to create the zigzag pattern;
 transverse grooves arranged over the entire tire circumference in each of said first shoulder rib and said second shoulder rib, wherein every other transverse groove comprises one or more chamfers extending into either the first shoulder groove or the second shoulder grove, whichever is nearest;
 from 120 to 140 transverse grooves arranged over the entire tire circumference in each of said central profile ribs, the length of each being at least 80% of the width of the central profile rib;
 said transverse grooves each having a width (B1) of at most 0.5 mm at a distance of 3.5 mm from the profile surface in each of said central profile ribs;
 each of said inner circumferential grooves having a width of at most 4 mm at a distance of 3.5 mm from the profile surface;

each of said shoulder grooves having a width of at most 3 mm;
said transverse grooves are arranged in an arrow shaped manner with an arrow tip;
said second circumferential groove is a middle inner circumferential groove; and,
said arrow tip is formed by said middle inner circumferential groove.

* * * * *